(12) United States Patent
Kench, III et al.

(10) Patent No.: US 6,786,522 B2
(45) Date of Patent: Sep. 7, 2004

(54) MODULAR RECONFIGURABLE VEHICLE RACK SYSTEM

(76) Inventors: Stanley F. Kench, III, 28 Erie Ave., Newburyport, MA (US) 01950; Thomas J. Kench, 12 Vernon Ave., Stoneham, MA (US) 02180

( * ) Notice: Subject to any disclaimer, the term of this patent is extended or adjusted under 35 U.S.C. 154(b) by 0 days.

(21) Appl. No.: 10/418,374

(22) Filed: Apr. 18, 2003

(65) Prior Publication Data

US 2004/0026945 A1 Feb. 12, 2004

Related U.S. Application Data

(60) Provisional application No. 60/373,716, filed on Apr. 18, 2002.

(51) Int. Cl.[7] .................................................. B60P 3/00
(52) U.S. Cl. ............................... 296/3; 296/29; 403/381
(58) Field of Search .............................. 296/3, 29, 205; 211/182; 403/381, 331, 363

(56) References Cited

U.S. PATENT DOCUMENTS

| | | | |
|---|---|---|---|
| 687,114 A | * | 11/1901 | Brown .......................... 296/29 |
| 1,048,694 A | * | 12/1912 | Heugher ....................... 296/29 |
| 2,720,414 A | | 10/1955 | Hart |
| 3,986,317 A | | 10/1976 | Mountz |
| 4,423,899 A | | 1/1984 | Langmead |
| 5,108,141 A | | 4/1992 | Anderson |
| 5,137,320 A | | 8/1992 | Christensen |
| 5,238,280 A | | 8/1993 | Christensen |
| 5,393,114 A | | 2/1995 | Christensen |
| 5,454,612 A | | 10/1995 | Christensen |
| 5,470,120 A | | 11/1995 | Christensen |
| 5,494,327 A | | 2/1996 | Derecktor |
| 5,513,890 A | | 5/1996 | Christensen |
| 5,664,793 A | * | 9/1997 | Engibarov .................. 403/381 |
| 5,725,137 A | | 3/1998 | Macdonald |
| 5,743,702 A | | 4/1998 | Gunderson |
| 5,927,782 A | | 7/1999 | Olms |
| 6,186,571 B1 | | 2/2001 | Burke |

* cited by examiner

*Primary Examiner*—Lori L. Coletta
(74) *Attorney, Agent, or Firm*—Iandiorio & Teska

(57) ABSTRACT

A modular, reconfigurable rack system including a plurality of members each including a tenon on selected external surfaces thereof, and a plurality of joint members each including a mortise section releasably clampable on the tenon of a first member and a tang receivable in the end of a second member, the tang including an adjustable bearing block which engages an internal surface of the second member to releasably lock the tang inside the second member.

28 Claims, 14 Drawing Sheets

MODULAR RECONFIGURABLE VEHICLE RACK SYSTEM

RELATED APPLICATIONS

This application claims priority of U.S. Provisional Application No. 60/373,716 filed Apr. 18, 2002.

FIELD OF THE INVENTION

This invention relates to vehicle rack systems and more particularly to a modular, reconfigurable rack system.

BACKGROUND OF THE INVENTION

Racks are typically employed on vehicles, such as pick-up trucks, vans, utility trucks, flatbed trucks, and the like, to carry, organize, and/or secure any number of items, e.g., ladders, lumber, pipes, and glass.

Typical conventional racks, such as disclosed in U.S. Pat. Nos. 5,513,890 and 5,494,327, both incorporated by reference herein, utilize support members and rails which incorporate T-shaped slot clamps and T-shaped fasteners (e.g., nuts and bolts) inserted into the T-slot to secure the various members to the rack and the vehicle. One drawback of the T-clamp design is that the strength of the rack system relies primarily on the strength of the fastener. Another drawback of the T-clamp is that as the fastener is tightened, the head of the T-shaped fastener located within the T-slot causes the sides of the T-shaped clamp to extend outwardly which reduces the strength of the clamping mechanism and may also cause the T-clamp to break. Yet another drawback of the T-clamp design is that the fasteners are prone to disengage from T-slot when stress is applied to the rack (e.g., heavy loads). Moreover, inserting and securing the fasteners (e.g., nuts and bolts) within the T-slot is complicated which results in a rack system which is difficult to assemble and reconfigure. Still another drawback of these conventional rack systems is that the T-slot is open to the environment and therefore easily accumulates dirt, dust, water, ice, snow, and the like, which causes the rack system to deteriorate and impair the ability to reconfigure the rack system. Moreover, conventional rack systems have limited reconfigurability and no modularity because the racks employ large sections of support members which are only able to slide along the rails of the rack system. The '327 patent also employs welded joints which further limits the ability to reconfigure the rack. Another drawback of conventional rack designs is that the design requires machining and/or drilling and/or welding to manufacture the rack system which increases the cost and limits reconfigurability.

SUMMARY OF THE INVENTION

It is therefore an object of this invention to provide a better modular and reconfigurable rack system.

It is a further object of this invention to provide such a rack system which is easily reconfigured.

It is a further object of this invention to provide such a rack system which is modular.

It is a further object of this invention to provide such a rack system which is easy to assemble and disassemble.

It is a further object of this invention to provide such a rack system which is strong and rigid.

It is a further object of this invention to provide such a rack system which reduces exposure to dirt, dust, snow, ice and water.

It is a further object of this invention to provide such a rack system which eliminates the need for a T-shaped clamp.

It is a further object of this invention to provide such a rack system which is inexpensive to manufacture.

The invention results from the realization that a truly innovative modular and reconfigurable rack system can be achieved by utilizing a plurality of members which include a tenon, and a plurality of adjustable joint members with a mortise section which releasably clamps on the tenons and a tang receivable in the end of the various members of rack system which includes a unique adjustable bearing block that engages an internal surface of the members to releasably interconnect the members of the system, thereby providing quick, easy assembly and reconfigurability of the rack system.

This invention features a modular, reconfigurable rack system including a plurality of members each including a tenon on selected external surfaces thereof, and a plurality of joint members each including a mortise section releasably clampable on the tenon of a first member and a tang receivable in the end of a second member, the tang including an adjustable bearing block which engages an internal surface of the second member to releasably lock the tang inside the second member.

In a preferred embodiment, the members may comprise rails and vertical support members which support one rail above another rail. The rails may include longerons and brace members extending between the longerons. The tenons and the mortise sections may form a dovetail joint. The tenons may include outwardly sloping opposing side surfaces and a flat top surface. The mortise sections may include inwardly sloping opposing side surfaces and a flat top surface. The tang includes opposing ledges for supporting the end of the second hollow member thereon. Each joint member may include a fixed member, the lower end including one portion of the mortise section, a clamp member including on a lower surface thereof the other portion of the mortise section, and an adjustable bearing block. The rack system may further include a fastener extending through the lower end of the fixed member and into the clamp member for driving the clamp member towards the fixed member releasably locking the mortise section on a tenon. The fixed member may include opposing first and second vertical surfaces and the bearing block includes a vertical bearing surface. The fixed member may further include an angled surface adjacent the first vertical surface supporting the adjustable bearing block thereon such that in a first position the bearing surface of the bearing block is coplanar with the second vertical surface of the fixed member and in a second position the bearing surface of the bearing block is offset outwardly from the second vertical surface of the fixed member. The vehicle rack system may further include a fastener extending through the fixed member and entering into the bearing block for driving the bearing block between the first and second positions. The rack system may further include fastener members having on one end thereof a mortise section releasably clampable on a tenon of the member and on another end thereof a fastener. The tang may be disposed perpendicular to the mortise section, or the tang may be angled with respect to the mortise section. The tang may be angled 10 degrees with respect to the mortise section. The tang may be angled in the range of about 10 to 45 degrees with respect to the mortise section. The tang may be angled in the range of about 0 to 90 degrees with respect to the mortise section. The vehicle rack system may further include a second plurality of joint members including on opposite ends thereof mortise sections. The rack system may further include a third plurality of joint members including on opposite ends thereof tangs. The members may be hollow, made of aluminum and formed by extrusion. The plurality of joints may be made of aluminum and formed by extrusion. The vehicle rack system may further include a protective member including on one side thereof a mortise section which receives a tenon of a member to protect it. The rack system may be attached to a vehicle. The vehicle may be chosen from the group consisting of a truck, a pick-up truck, a flatbed truck, a van, a utility truck, a sports utility vehicle, or an automobile.

This invention further features a modular, reconfigurable rack system including a plurality of members each including a tenon on selected external services thereof, a plurality of joint members each including a mortise section releasably clampable on the tenon of a first member and a tang receivable in the end of a second member, the tang including an adjustable bearing block which engages an internal surface of the second member to releasably lock the tang inside the second member; and a fixed member, the lower end including one portion of the mortise section, a fixed member, the lower end including one portion of the mortise section, a clamp member including on a lower surface thereof the other portion of the mortise section, and an adjustable bearing block.

This invention also features a modular, reconfigurable vehicle rack system including a plurality of members each including a tenon on all four external services thereof, a plurality of joint members each including a mortise section releasably clampable on the tenon of a first member and a tang receivable in the end of a second member, the tang including an adjustable bearing block which engages an internal surface of the second member to releasably lock the tang inside the second member; and a fixed member, the lower end including one portion of the mortise section, a fixed member, the lower end including one portion of the mortise section, a clamp member including on a lower surface thereof the other portion of the mortise section, an adjustable bearing block, and a fastener extending through the lower end of the fixed member and into the clamp member for driving the clamp member towards the fixed member releasably locking the mortise section on a tenon.

This invention further features a modular, reconfigurable rack system including a plurality of joint members each including a mortise section releasably clampable on the tenon of a first member and a tang receivable in the end of a second member, the tang including an adjustable bearing block which engages an internal surface of the second member to releasably lock the tang inside the second member.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
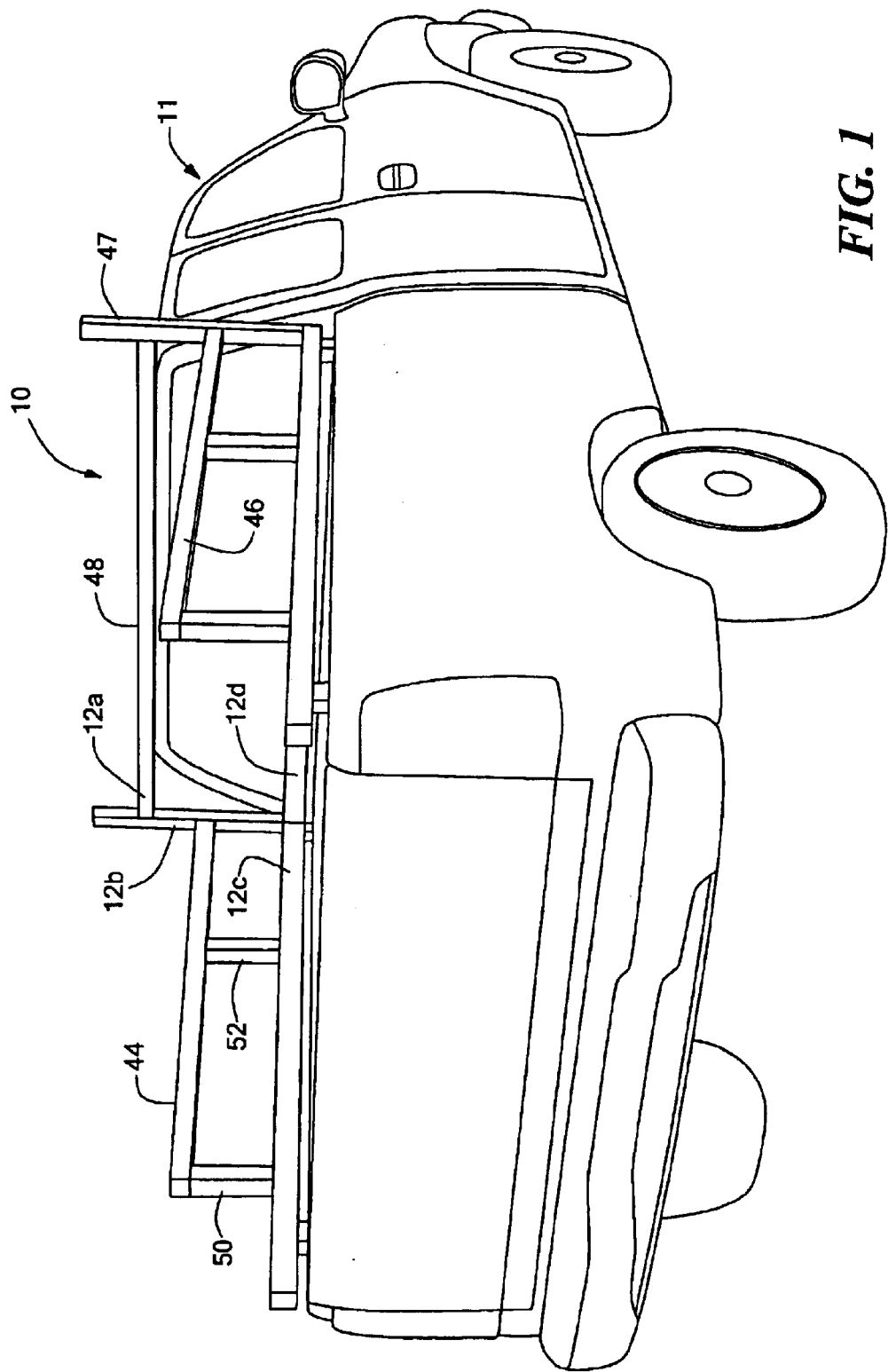
FIG. 1 is a schematic three-dimensional view of one embodiment of modular, reconfigurable rack system of this invention shown mounted on a truck.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

As delineated in the Background section above, prior art rack systems have minimal ability to be reconfigured, are complicated to assemble, lack any modularity, and lack strength because the T-shaped clamping mechanism relies on the strength of the fastener, is prone to disengage from the T-slot, and may break as the T-clamp is tightened. Moreover, the T-slot is open to the environment and hence easily accumulates dirt, dust, water, ice, snow, and the like, causing the rack system to deteriorate and impairing the ability to reconfigure the rack system.

Figure 2:
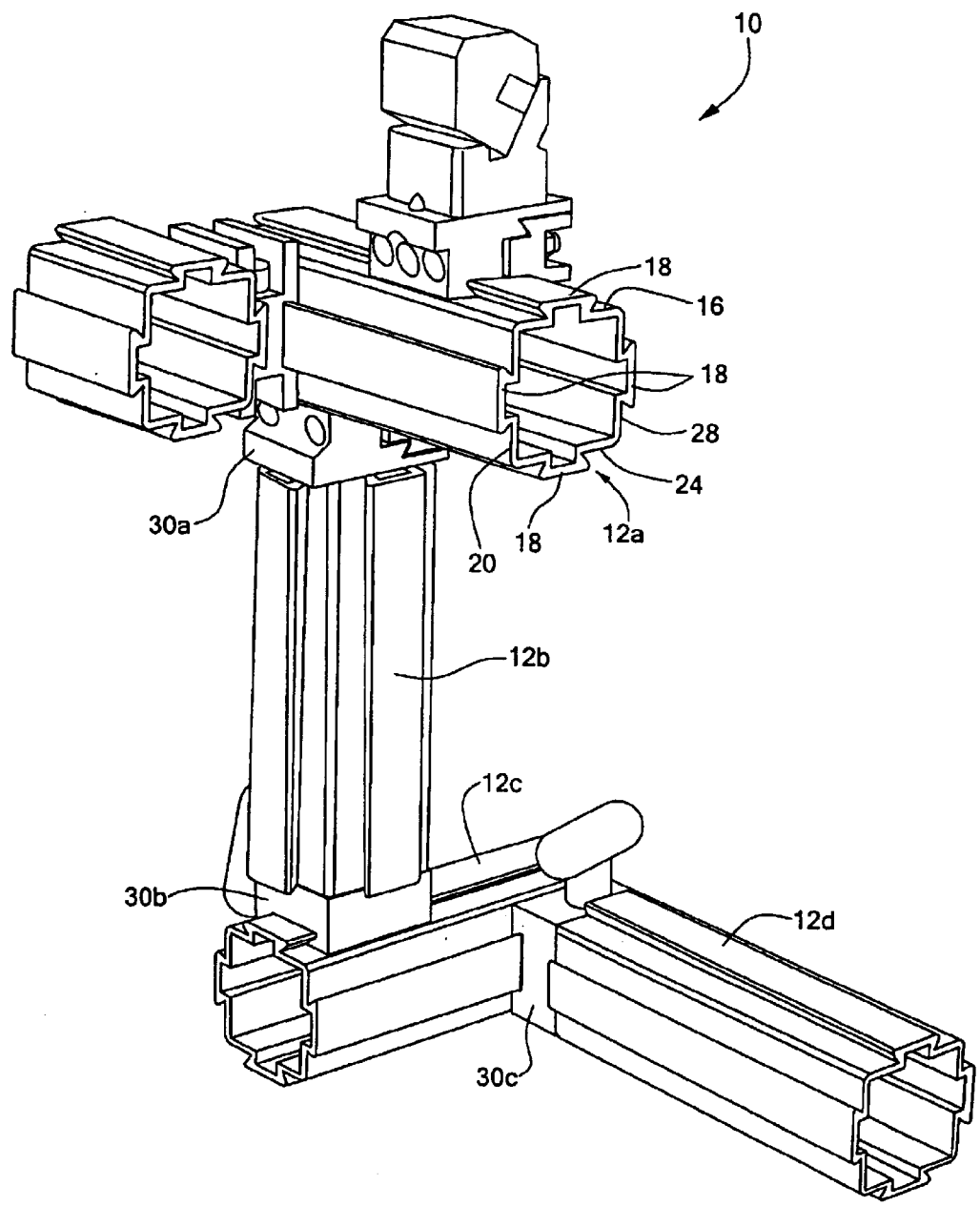
FIG. 2 is an enlarged schematic three-dimensional view showing in greater detail one portion of the rack system shown in FIG. 1.

In contrast, modular, reconfigurable rack system 10, FIG. 1 of this invention as shown mounted on truck 11 includes plurality of members, such as members 12a, 12b, 12c and 12d, each including tenon 18, FIG. 2 typically on selected surfaces of the member. For example, member 12a includes tenon 18 on selected surfaces 16, 20, 24, and 28. A complete rack system also includes plurality of joint members 30a, 30b, and 30c which each include a mortise section, e.g., mortise section 32, FIG. 3 of joint member 30a, releasably clampable on tenon 18 on a first member, e.g., member 12a. The joint members also include a tang, such as tang 34 of joint member 30a, receivable in end 36 of second member 38 shown in phantom. Thus, joint member 30a releasably interconnects members 12a and 38, mortise section 32 clamps on tenon 18 of member 12a, and tang 34 releasably clamps within the end of member 38.

Tang 34 includes adjustable bearing block 40 which engages internal surface 42 of second member 38 to releasably lock tang 34 inside second member 38. Tang 34 ideally includes opposing ledges 74 and 76 for supporting ends 35 and 37 of second member 38 thereon. Typically, tenon 18 includes outwardly sloping opposing side surfaces 62 and 64 and flat top surface 66. Mortise section 32 ideally includes inwardly sloping opposing side surfaces 68 and 70, and flat top surface 72. In one design, the tenons (e.g., tenon 18) and the mortise sections (e.g., mortise section 32) form dovetail joint 60.

Each joint member of rack system 10, e.g., joint member 30*a*, includes fixed member 86 in which lower end 85 includes one portion of mortise section 32. Rack system 10 may also include clamp member 88 including lower surface 90 of portion 92 of mortise section 32 and adjustable bearing block 98. In one design, system 10 includes fastener 100 extending through lower end 85 of fixed member 86 and may be threaded into clamp member 88, or inserted into clamp member 88 without threads into a nut (not shown) which are prevented from rotating by fixed member 86, for driving clamp member 88 towards fixed member 86 to releasably lock mortise section 32 on tenon 18, e.g., to engage dovetail joint 60. This allows fastener 100 to be made of a higher strength material, e.g., alloy, stainless steel, and the like, than rack system 10 and also reduces manufacturing cost of rack system 10. Fixed member 86 ideally includes opposing first and second vertical surfaces 106 and 108. Bearing block 98 may also include vertical bearing surface 110 and/or vertical bearing surface 112.

In one preferred embodiment, fixed member 86 includes angled surface 116 adjacent to vertical surface 108 for supporting adjustable bearing block 98 thereon such that in first position, indicated at 120, bearing surface 112 of bearing block 98 is coplanar with second vertical surface 106 and in a second position, indicated at 122, bearing surface 112 of bearing block 98 is outwardly offset from second vertical surface 106 of fixed member 86 to engage surface 42 of second member 38. In one example, fastener 130 extends through fixed member 86 and may be threaded into bearing block 98, or inserted into bearing block 98 without threads into a nut (not shown) which are prevented from rotation by bearing block 92, to drive bearing block 98 between first position, indicated at 120, and second position, indicated at 122. This allows fastener 130 to be made of a higher strength material, e.g., alloy, stainless steel, and the like, than rack system 10 and also reduces manufacturing cost of rack system 10.

Figure 4:
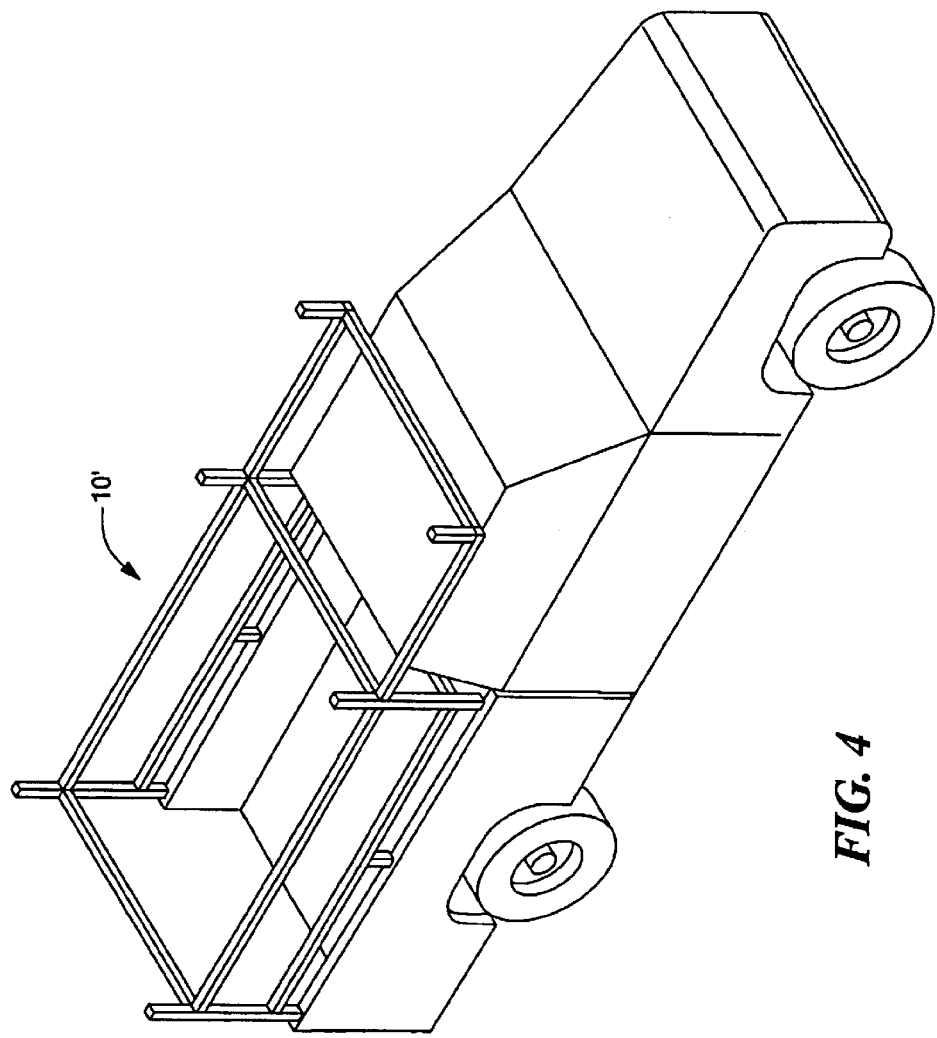
FIG. 4 is a schematic three-dimensional view of another configuration of the rack system of this invention.
Figure 5:
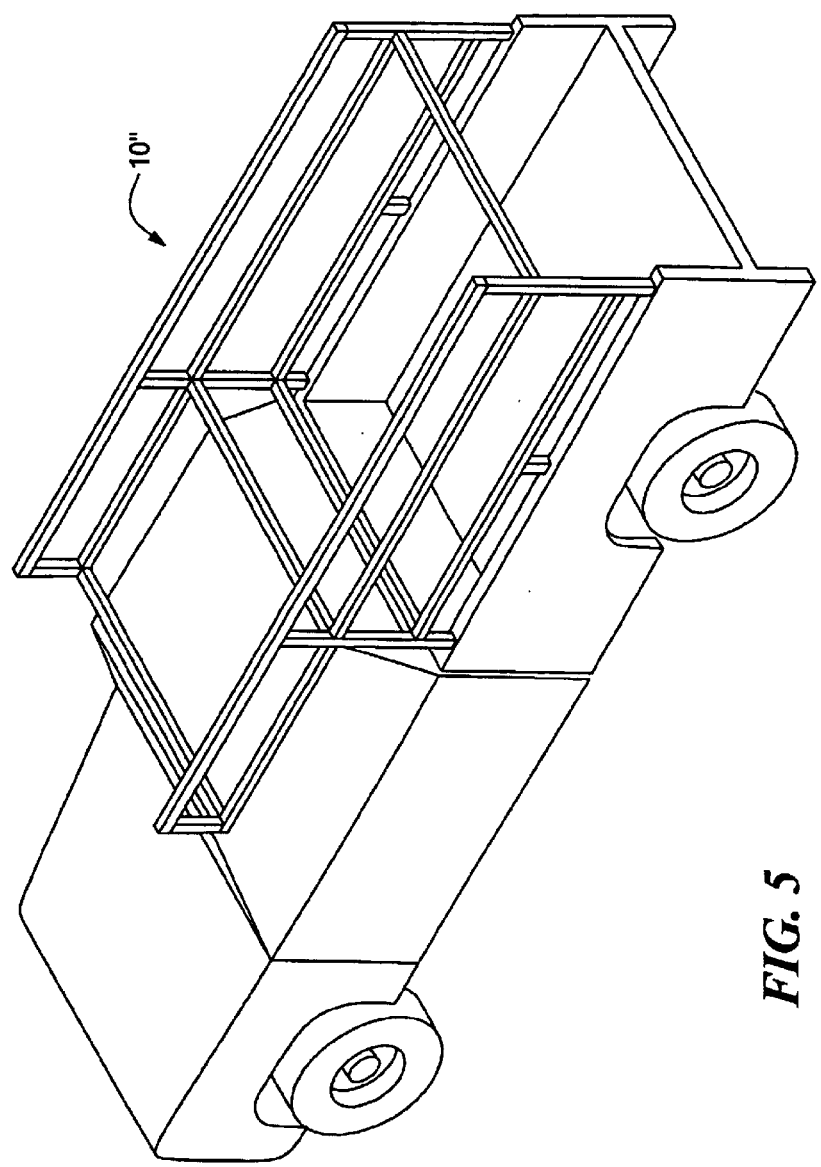
FIG. 5 is a schematic three-dimensional view of yet another configuration of the rack system of this invention.

The innovative adjustable joint members with a mortise section which releasably engage the tenon of one set of members and the tang with the unique adjustable bearing block to engage the internal surface of a second set of members to releasably lock the tang inside a member of the rack system results in a rack system which can quickly and easily be assembled and reconfigured into, for example, rack system 10', FIG. 4 and rack system 10", FIG. 5. The adjustable joint members form a strong and secure dovetail joint and the adjustable bearing block provides for a strong and secure attachment of the various members of rack system 10. Rack system 10 does not rely on the strength of fasteners, eliminates the complicated step of securing T-shaped fasteners with nuts and bolts, and eliminates the T-slot which accumulates water, dust, dirt, snow, ice, and the like.

In one embodiment of this invention, the members of rack system 10 comprise rails and vertical support members which support one rail above the other rail. For example, as shown in FIG. 1, member 12*b* is a vertical support member which, in conjunction with vertical support member 47, supports rail 48. In one embodiment, the rails include longerons and brace members extending between the longerons. For example, rack system 10 may include longerons 44 and 46 with rail or brace 48 extending between longerons 44 and 46.

Figure 6:
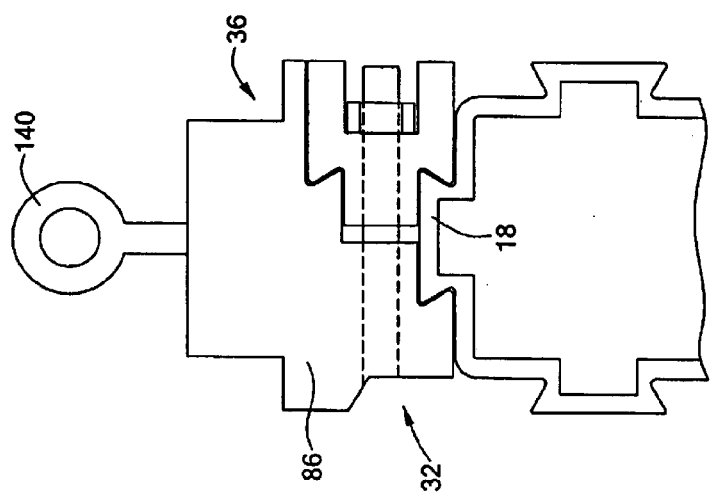
FIG. 6 is a schematic side view showing a fastener member attached to a joint member of the rack system in accordance with this invention.

Rack system 10 ideally further includes fastener members, such as fastener member 140, FIG. 6 having on one end thereof mortise section 32 releasably clampable on tenon 18 of a member 12*a*. Fastener member 140 provides for the attachment of ropes, cables, straps and the like, for securing various items, e.g., ladders, lumber, pipes and the like, to the various members of rack system 10, e.g., longerons 44 and 46 and rail 48.

Figure 3:
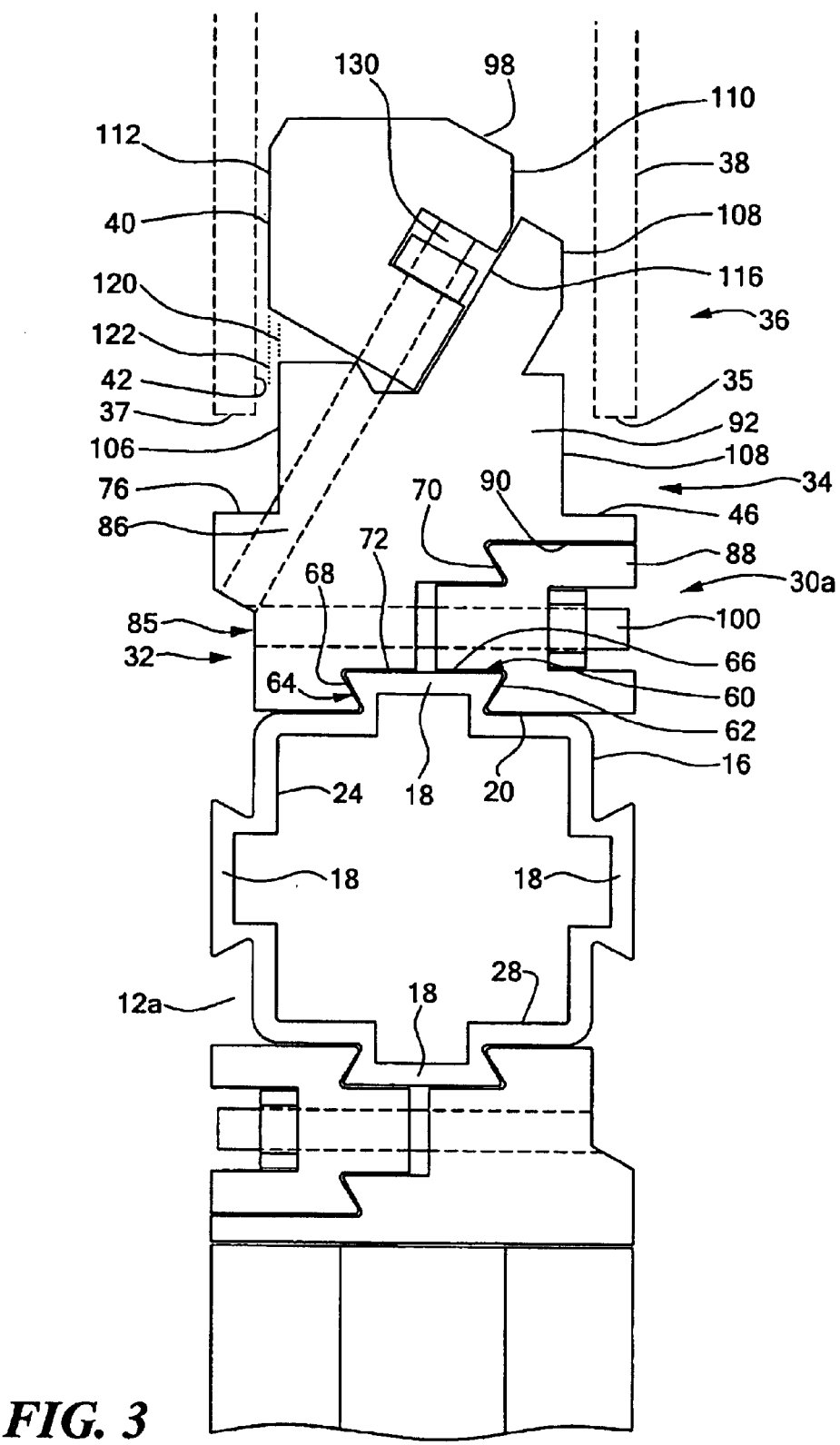
FIG. 3 is an enlarged schematic side view showing in greater detail the primary components associated with each joint member of the rack system shown in FIG. 2.
Figure 7:
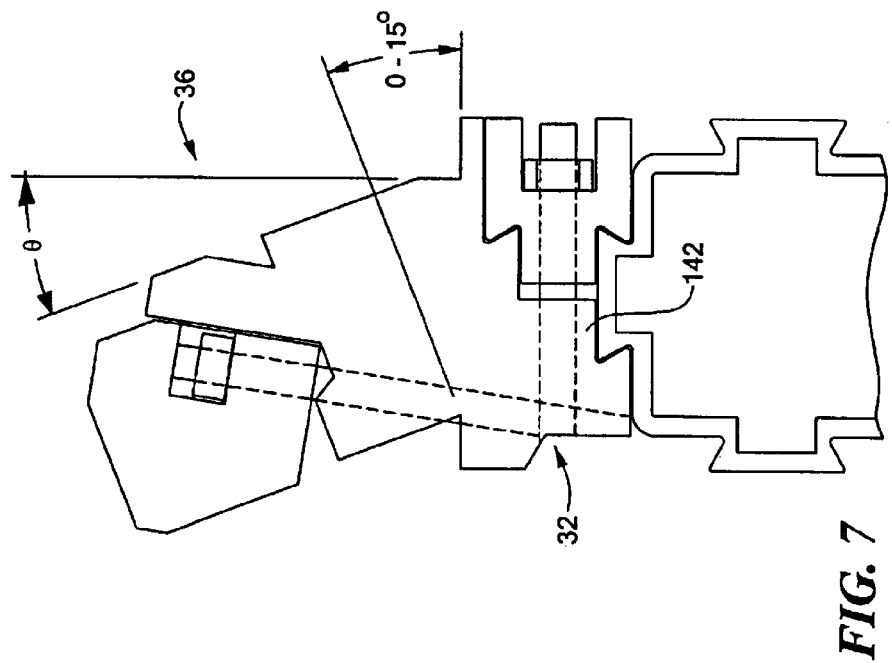
FIG. 7 is a schematic side view showing one embodiment of the joint member of this invention employing an angled tang.
Figure 8A:
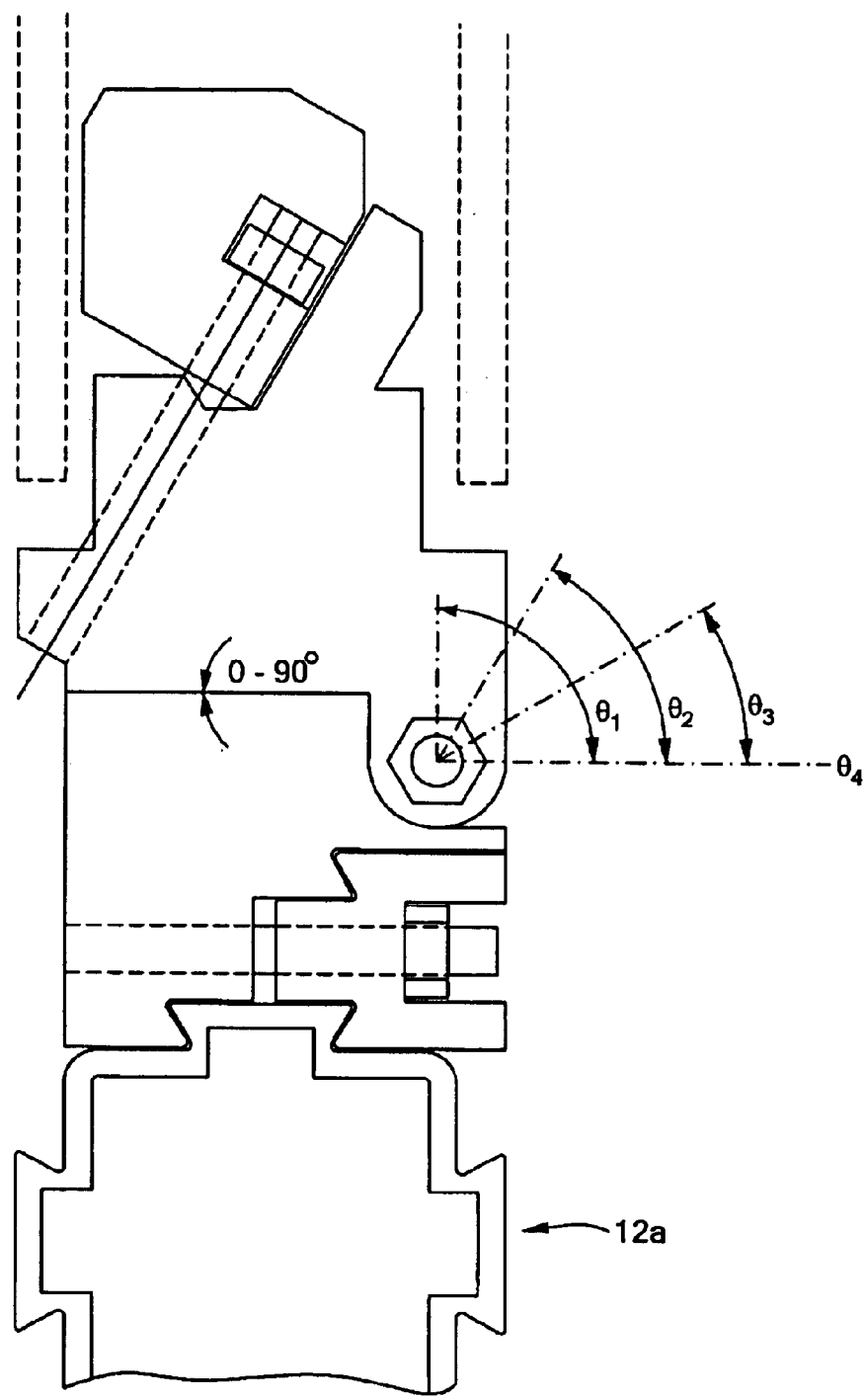
FIGS. 8A–8C are schematic side and three-dimensional views of another embodiment of the joint member of this invention employing an angled tang.
Figure 8B:
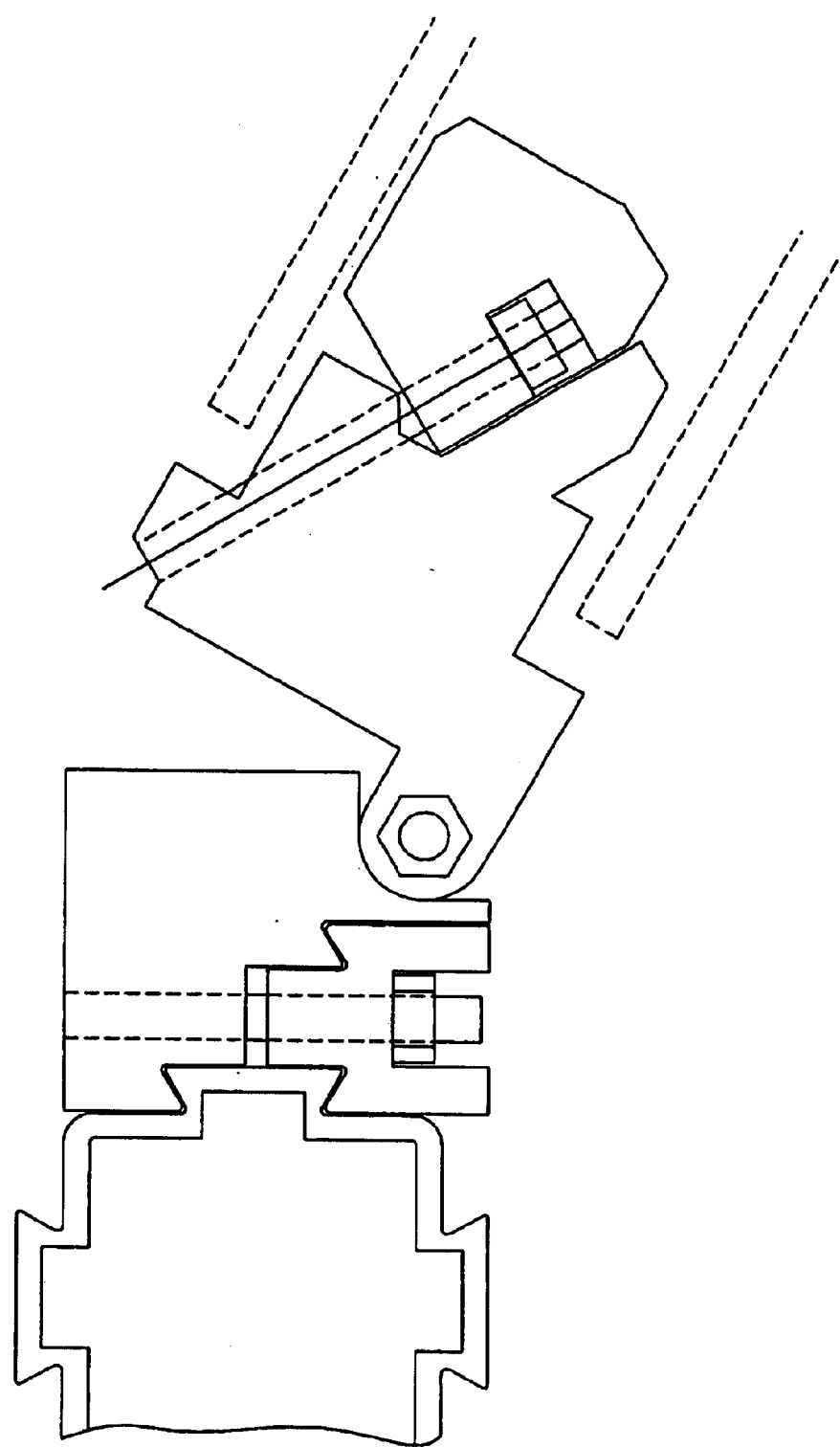
Figure 8C:
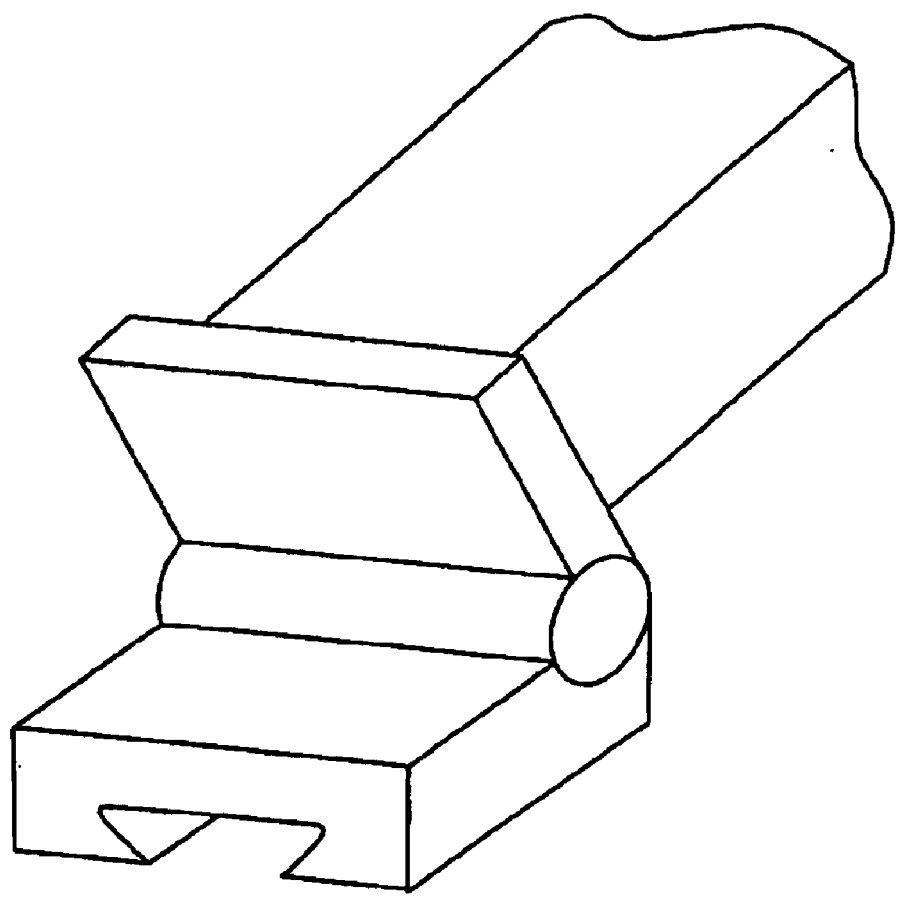
Figure 9:
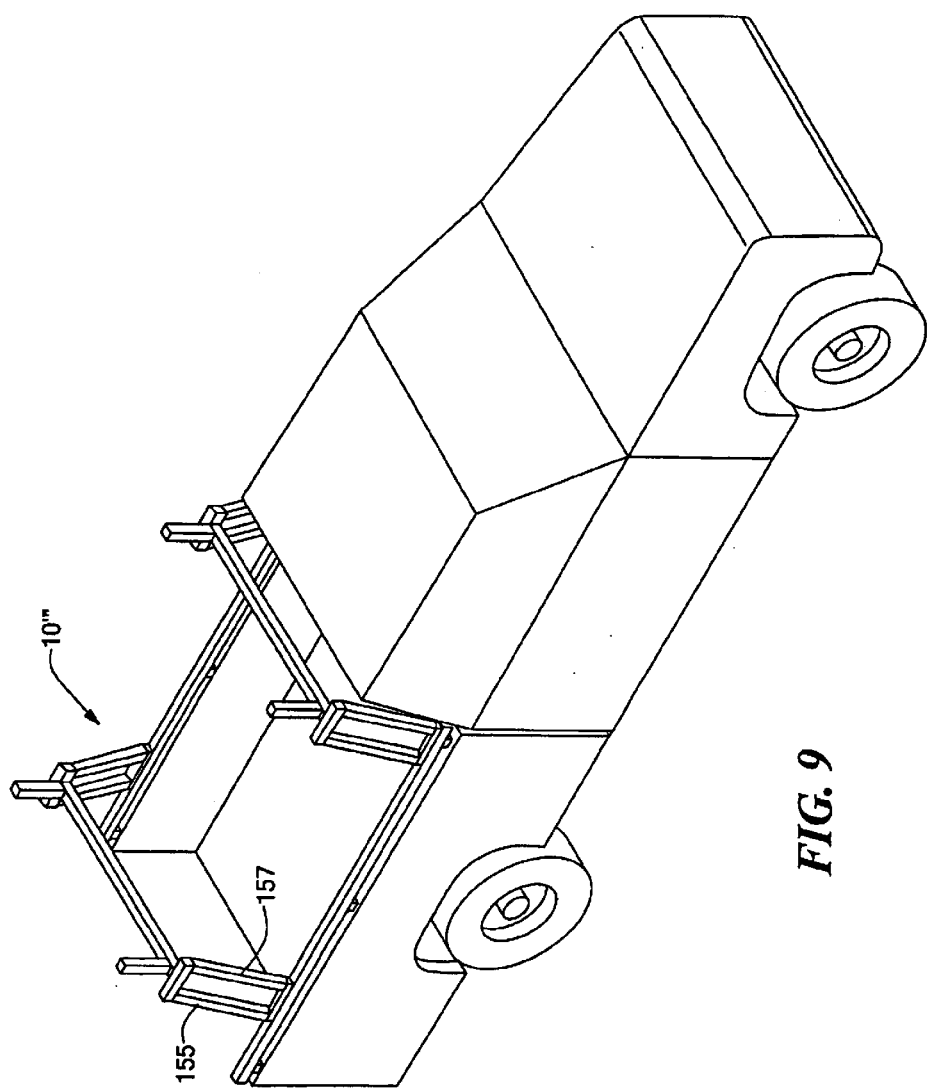
FIG. 9 is a schematic three-dimensional view of one embodiment of the rack system of this invention incorporating the angled tang shown in FIGS. 7 and 8A–8C.

Tang 36 is typically disposed perpendicular to mortise section 32, as shown in FIGS. 3 and 4. In other designs, tang 36, FIG. 7 may be angled with respect to mortise section 32, as indicated by angle 150. Typically angle 150 is about 15 degrees. In other designs, angle 150 is in the range of about 10 to 45 degrees. In other designs, tang 36, as shown in FIGS. 8A–8C may be adjusted from zero to ninety degrees, e.g., $\theta_1, \theta_2, \theta_3, \theta_4$, FIG. 8A. This unique feature provides the ability for rack system 10''', FIG. 9 to include pitched clamping of the members, e.g., pitched clamping members 155 and 157 and provides additional configurability and adjustment of the rack system of this invention.

Figure 10:
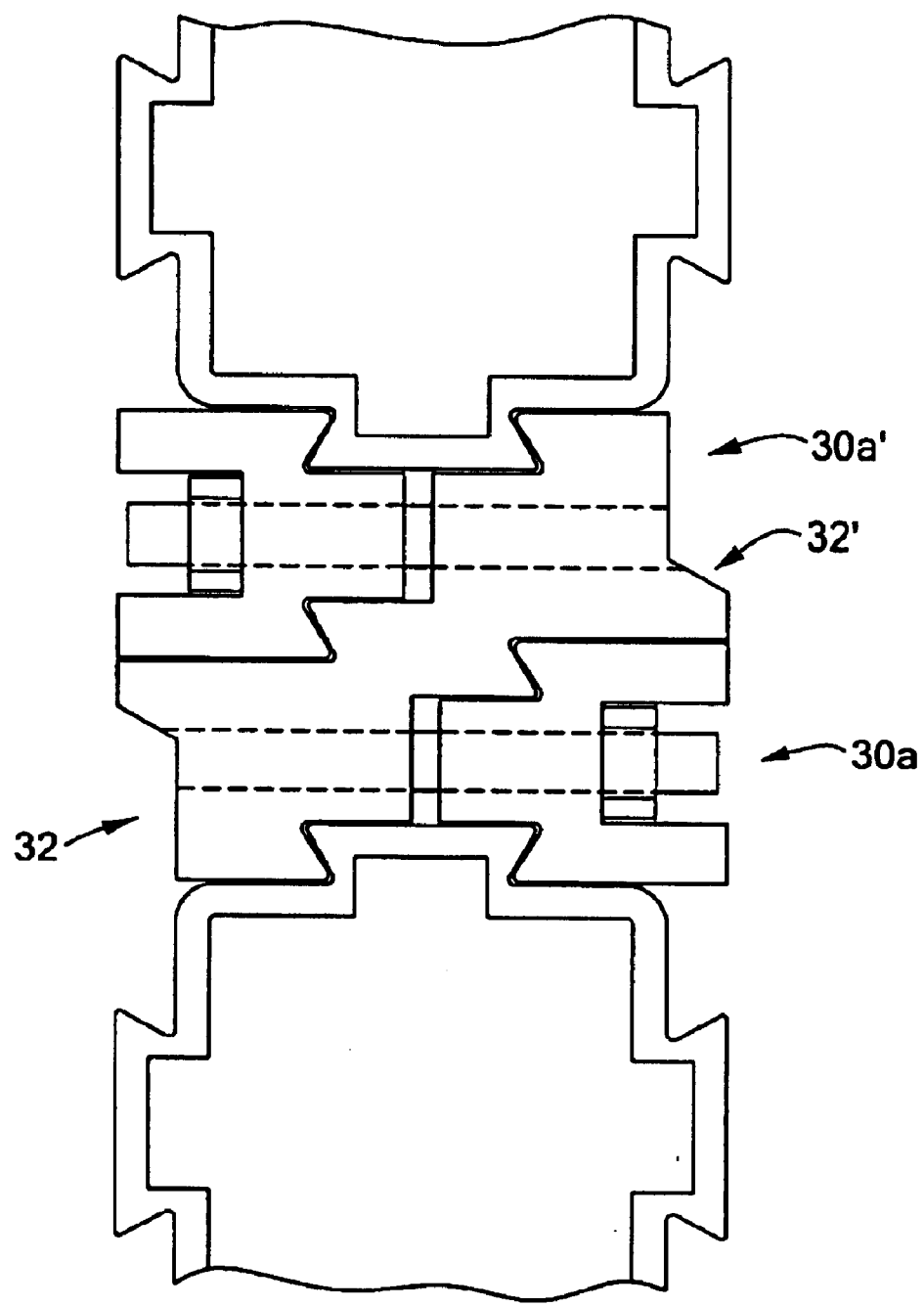
FIG. 10 is a schematic side view of a second plurality of joint members of this invention including opposing mortise sections.
Figure 11:
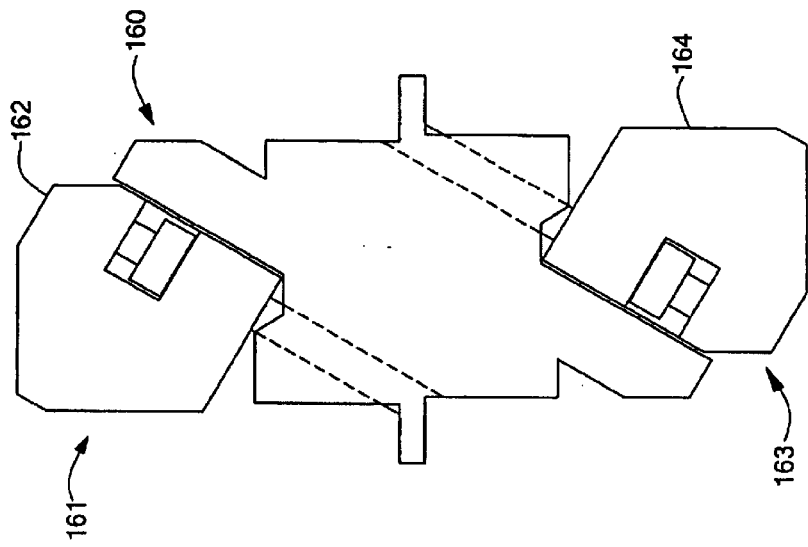
FIG. 11 is a schematic side view of a third plurality of joint members of this invention including opposing tangs.

Rack system 10 may further include joint members 30*a* and 30*a'* each including opposing mortise sections, as shown in FIG. 10. Another type of joint member 160, FIG. 11 includes opposing tangs 162 and 164 on opposite ends 161 and 163, respectively.

Typically, the members of rack system 10 (e.g., members 12*a*, 12*b*, 12*c*, 12*d*, FIGS. 1–3) are hollow, made of aluminum and formed by extrusion. The plurality of joints, e.g., joints 30*a*, 30*b*, 30*c* are ideally made of aluminum and formed by extrusion.

Figure 12:
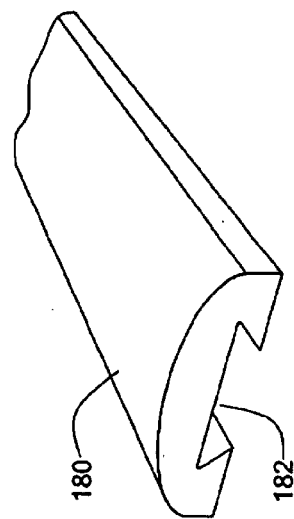
FIG. 12 is a schematic three-dimensional top view showing a protective member which can be attached to the tenon of a member of the rack system of this invention.

In one design, rack system 10 also includes protective member 180, FIG. 12 which includes mortise section 182 which receives the tenon of a member to protect the tenon.

Figure 13A:
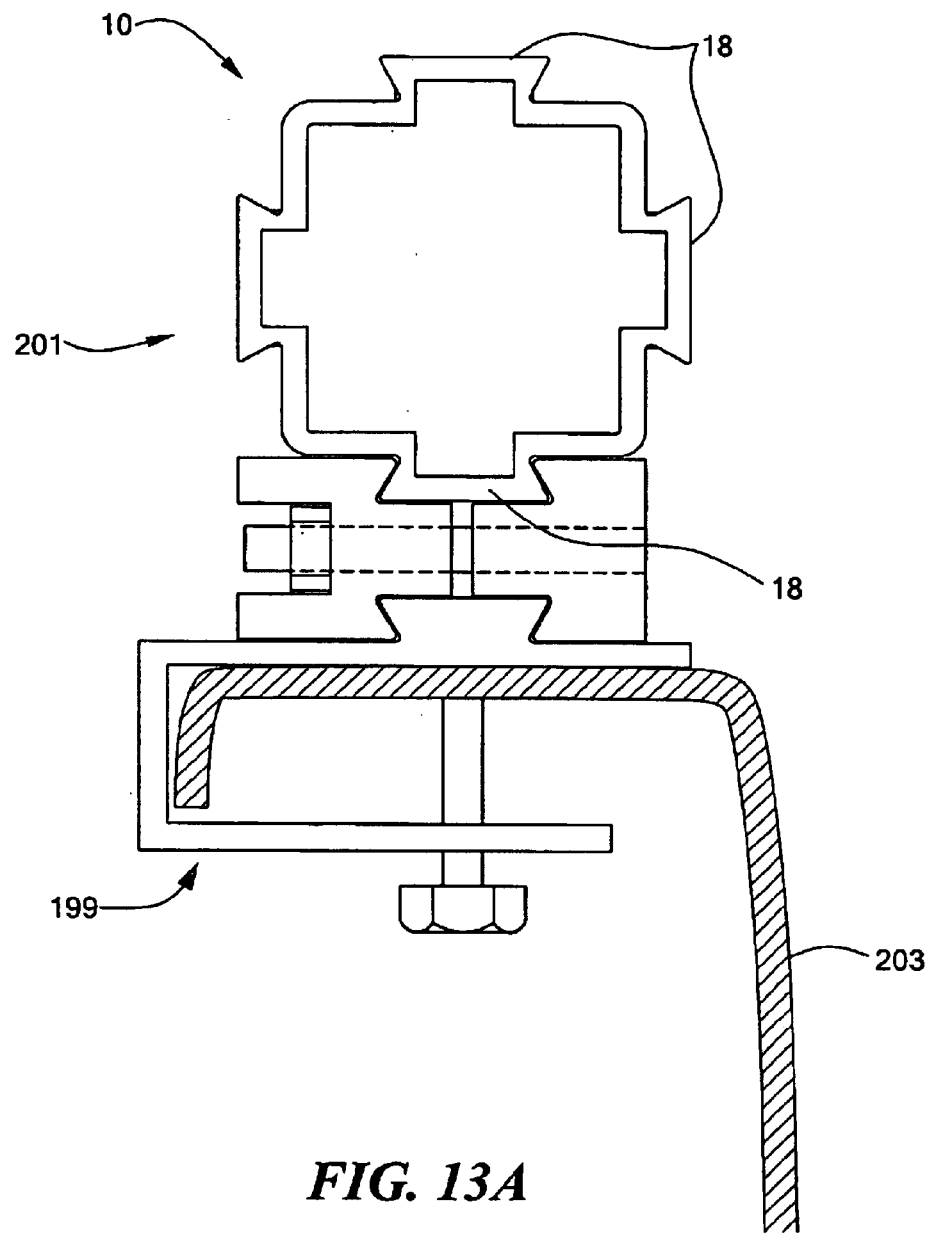
FIGS. 13A and 13B are schematic side views showing the attachment of the rack system of this invention to a vehicle.
Figure 13B:
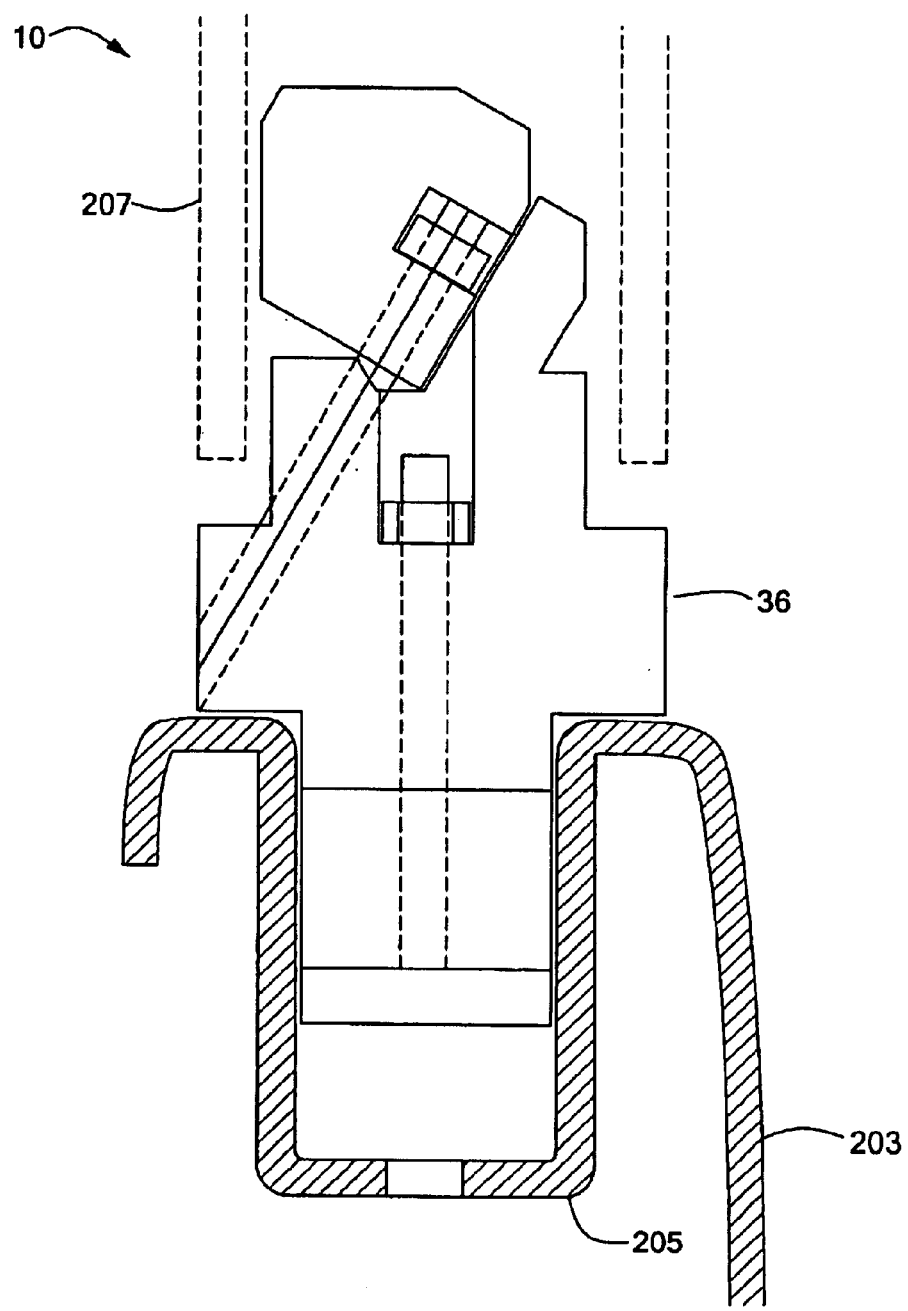

In one preferred embodiment, rack system 10, FIGS. 1, 4, 5, and 9 is attached to a vehicle, such as a truck, a pick-up truck, a flatbed truck, a van, a utility truck, a sports utility vehicle, or an automobile. In one example, the members, e.g., member 201, FIG. 13A of rack system 10 may be secured to truck bed 203 by any number of connectors such as clamp or bolt means 199 clamped to the tenons (e.g., tenons 18) or by utilizing a tang (e.g., tang 36, FIG. 13B) inserted into an end of one of the members, such as stake pocket 205 which is inserted into truck bed 203. Tang 36 may also be secured to member 207 of rack system 10.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A modular, reconfigurable rack system comprising:
   a plurality of members each including a tenon on selected external surfaces thereof; and
   a plurality of joint members each including a mortise section releasably clampable on the tenon of a first member and a tang receivable in a end of a second member, the tang including an adjustable bearing block which engages an internal surface of the second member to releasably lock the tang inside the second member.

2. The rack system of claim 1 in which the members comprise rails and vertical support members which support one rail above another rail.

3. The rack system of claim 2 in which the rails include longerons and brace members extending between the longerons.

4. The rack system of claim 1 in which the tenons and the mortise sections form a dovetail joint.

5. The rack system of claim 4 in which the tenons include outwardly sloping opposing side surfaces and a flat top surface.

6. The rack system of claim 5 in which the mortise sections include inwardly sloping opposing side surfaces and a flat top surface.

7. The rack system of claim 1 in which the tang includes opposing ledges for supporting the end of the second hollow member thereon.

8. The rack system of claim 1 in which each joint member includes:
a fixed member, a lower end including one portion of the mortise section; and
a clamp member including on a lower surface thereof the other portion of the mortise section.

9. The rack system of claim 8 further including a fastener extending through the lower end of the fixed member into the clap member for driving the clamp member towards the fixed member releasably locking the mortise section on one of the tenons.

10. The rack system of claim 8 in which the fixed member including opposed first and second vertical surfaces and the adjustable bearing block including a vertical bearing surface.

11. The rack system of claim 10 in which the fixed member further includes an angled surface adjacent the first vertical surface supporting the adjustable bearing block thereon such that in a first position the bearing surface of the bearing block is coplanar with the second vertical surface of the fixed member and in a second position the bearing surface of the bearing block is offset outwardly from the second vertical surface of the fixed member.

12. The rack system of claim 11 further including a fastener extending through the fixed member and entering into the bearing block for driving the bearing block between the first and second positions.

13. The rack system of claim 1 further including fastener members having on one end thereof a mortise section releasably clampable on the tenon of one of said members and on another end thereof a fastener.

14. The rack system of claim 1 in which the tang is disposed perpendicular to the mortise section.

15. The rack system of claim 1 in which the tang is angled with respect to the mortise section.

16. The rack system of claim 15 in which the tang is angled 15 degrees with respect to the mortise section.

17. The rack system of claim 15 in which the tang is angled in the range of about 10 to 45 degrees.

18. The rack system of claim 15 in which the tang is angled in the range of about 0 to 90 degrees.

19. The rack system of claim 1 further including a second plurality of joint members including on opposite ends thereof mortise sections.

20. The rack system of claim 1 further including a third plurality of joint members including on opposite ends thereof tangs.

21. The rack system of claim 1 in which the members are hollow, made of aluminum and formed by extrusion.

22. The rack system of claim 1 in which the plurality of joints are made of aluminum and formed by extrusion.

23. The rack system of claim 1 further including a protective member including one side thereof a mortise section which receives the tenon of one of the members to protect it.

24. The rack system of claim 1 in which the rack system is attached to a vehicle.

25. The rack system of claim 24 in which said vehicle is chosen from the group consisting of: a truck, a pick-up truck, a flatbed truck, a van, a utility truck, a sports utility vehicle, and an automobile.

26. A modular, reconfigurable rack system comprising:
a plurality of members each including a tenon on selected external services thereof;
a plurality of joint members each including a mortise section releasably clampable on the tenon of a first member and a tang receivable in an end of a second member, the tang including an adjustable bearing block which engages an internal surface of the second member to releasably lock the tang inside the second member;
a fixed member, a lower end including one portion of the mortise section; and
a clamp member including on a lower surface thereof the other portion of the mortise section.

27. A modular, reconfigurable vehicle rack system comprising:
a plurality of members each including a tenon on all four external services thereof;
a plurality of joint members each including a mortise section releasably clampable on the tenon of a first member and a tang receivable in an end of a second member, the tang including an adjustable bearing block which engages an internal surface of the second member to releasably lock the tang inside the second member;
a fixed member, a lower end including one portion of the mortise;
a clamp member including a lower surface thereof the other portion of the mortise section; and
a fastener extending through the lower end of the fixed member and into the clamp member for driving the clamp member towards the fixed member releasably locking the mortise section on the tenon.

28. A modular, reconfigurable rack system comprising:
a plurality of joint members each including a mortise section releasably clampable on a tenon of a first member and a tang receivable in a end of a second member, the tang including an adjustable bearing block which engages an internal surface of the second member to releasably lock the tang inside the second member.

* * * * *